United States Patent
Fadell

(10) Patent No.: US 7,281,214 B2
(45) Date of Patent: Oct. 9, 2007

(54) AUTOMATICALLY UPDATING USER PROGRAMMABLE INPUT SENSORS TO PERFORM USER SPECIFIED FUNCTIONS

(75) Inventor: Anthony M. Fadell, Portola Valley, CA (US)

(73) Assignee: Apple Inc., Cupertino, CA (US)

(*) Notice: Subject to any disclaimer, the term of this patent is extended or adjusted under 35 U.S.C. 154(b) by 160 days.

(21) Appl. No.: 10/654,675

(22) Filed: Sep. 3, 2003

(65) Prior Publication Data

US 2004/0242269 A1 Dec. 2, 2004

Related U.S. Application Data

(60) Provisional application No. 60/475,580, filed on Jun. 2, 2003.

(51) Int. Cl.
*G06F 3/00* (2006.01)
*G06F 3/02* (2006.01)

(52) U.S. Cl. ............. 715/745; 715/744; 715/748; 715/771; 715/827; 345/172

(58) Field of Classification Search ............ 715/827, 715/864, 744–748, 778, 865; 345/172
See application file for complete search history.

(56) References Cited

U.S. PATENT DOCUMENTS

| 5,121,477 | A | * | 6/1992 | Koopmans et al. ......... 715/762 |
|---|---|---|---|---|
| 5,287,514 | A | * | 2/1994 | Gram ......................... 715/826 |
| 5,867,729 | A | * | 2/1999 | Swonk ......................... 710/8 |
| 5,936,614 | A | * | 8/1999 | An et al. .................... 345/173 |
| 6,199,125 | B1 | * | 3/2001 | Cortesi ........................ 710/67 |
| 6,255,966 | B1 | * | 7/2001 | Siegmund et al. ............ 341/22 |
| 6,505,086 | B1 | * | 1/2003 | Dodd et al. ................... 700/65 |
| 6,717,569 | B1 | * | 4/2004 | Gruhl et al. ................. 345/157 |
| 6,720,951 | B2 | * | 4/2004 | Taguchi ....................... 345/172 |
| 6,724,370 | B2 | * | 4/2004 | Dutta et al. ................. 345/169 |
| 6,810,272 | B2 | * | 10/2004 | Kraft et al. .................. 455/566 |
| 6,829,512 | B2 | * | 12/2004 | Huang et al. ................. 700/65 |
| 6,848,014 | B2 | * | 1/2005 | Landron et al. ............. 710/303 |
| 2002/0093535 | A1 | * | 7/2002 | Murphy ....................... 345/764 |
| 2002/0103881 | A1 | * | 8/2002 | Granade et al. ............. 709/218 |
| 2003/0037020 | A1 | * | 2/2003 | Novak et al. ................... 707/1 |
| 2003/0197736 | A1 | * | 10/2003 | Murphy ....................... 345/780 |
| 2003/0229654 | A1 | * | 12/2003 | Bibas et al. ................. 707/203 |
| 2004/0001098 | A1 | * | 1/2004 | Numano ...................... 345/773 |
| 2004/0242269 | A1 | * | 12/2004 | Fadell ....................... 455/556.2 |

OTHER PUBLICATIONS

Screen Dumps of Microsoft Word (2000, pp. 1-2).*

* cited by examiner

*Primary Examiner*—Sy D. Luu
(74) *Attorney, Agent, or Firm*—Beyer Weaver LLP

(57) ABSTRACT

In a portable multimedia device, a method, apparatus, and system for automatically updating programmable buttons on a remote client device using a set of user preferences is described. A remote client device is coupled (either wired or wirelessly) to the host computer and the preference file is passed to the remote client device which uses the preference file to automatically update any programmable buttons included therein to execute the desired suite of functions. In some cases, a combination of buttons can be used to perform a particular function whereas in other cases, a single button can be associated with a particular function.

35 Claims, 11 Drawing Sheets

AUTOMATICALLY UPDATING USER PROGRAMMABLE INPUT SENSORS TO PERFORM USER SPECIFIED FUNCTIONS

BACKGROUND OF THE INVENTION

1. Field of the Invention

This invention relates generally to remote client devices such as multimedia players, cell phones, and personal digital assistants. More specifically, the invention describes a method and apparatus for automatically updating user programmable input sensors (such as buttons) to perform any of a suite of user supplied functions.

2. Description of Related Art

Recent developments in consumer electronics have included the introduction of remote client devices that, due to their small size, have limited display capabilities. Such limited display remote client devices include portable multimedia asset players (such as MP3 players, minidisk players), cell phones, personal digital assistants (PDAs) and the like. Unfortunately, the very nature of the limited display capabilities of these (and other) devices, precludes the use of all but a simple graphical user interface having a very limited number of displayable icons for providing any of a number of useful control functions. Therefore, most of these devices rely upon a fixed set of control buttons in addition to any displayable input icons to provide a suitable user interface for control of the device.

For example, in the case of an MP3 player, a number of digitized audio files in the form of MP3 files are stored in a storage medium included in or coupled to the player in a fashion deemed most suitable to that user. In the case of MP3 files, for example, a user of the MP3 player must be able to conveniently interact with the player in order to peruse and select a particular file (or files) based upon such characteristics as music genre, author, album, or whatever grouping of MP3 files is present in the MP3 player. In addition to merely selecting a particular file, it would be of great convenience to the user to be able to perform additional control functions (such as next/previous song, increase/decrease volume, skip next album, etc.) using only those input icons as well as input buttons already available to the user.

Unfortunately, however, conventionally configured MP3 players (and other assorted limited display client devices) offer only a fixed set of control inputs that perform but a fixed set of control functions. For example, a typical MP3 player uses a particular input button to perform a scroll up function and another to perform a scroll down feature, whereas another button is used to scroll left and yet another to scroll right. In some cases, a toggle feature can limit the physical number of buttons required but the fact remains that the functions performed are fixed and immutable and therefore offer no ability to customize the suite of functions performed.

What is required is a method and apparatus that affords a user of a remote client device the ability to customize available user inputs to perform any of a suite of user supplied functions.

SUMMARY OF THE INVENTION

The invention described herein pertains to a method and apparatus that affords a user of a limited display client device the ability to customize available user inputs to perform any of a suite of user supplied functions. In one embodiment, a method of automatically updating programmable buttons on a remote client device using a set of user preferences is described. A user preference file is created on a host computer based upon those functions a user would like to execute on a remote client device (such as an MP3 player) using only available input buttons. Once the remote client device is coupled (either wired or wirelessly) to the host computer, the preference file is passed to the remote client device. The remote client device, in turn, uses the preference file to automatically update any programmable buttons included therein to execute the desired suite of functions. In some cases, a combination of buttons can be used to perform a particular function whereas in other cases, a single button can be associated with a particular function. In this way, the number of functions that can be executed by the client device can be greater than the total number of input buttons available.

In another embodiment, a thin client device arranged to be coupled to a host computer suitably configured for storing any of a number of appropriately formatted data files is described. The thin client includes a display unit for displaying selected graphical data, a processor coupled to the display unit for executing selected instructions, a user interface coupled to the processor arranged to receive user supplied input events, and a user interface programming unit coupled to the user interface arranged to selectively program the user interface based upon a selected number of functions to be performed by the user interface.

In still another embodiment of the invention, a system arranged to automatically update a number of user programmable user interface buttons in a client device coupled to a host computer. The system includes a preference file generator coupled to the host computer and a programmable buttons programming unit configured to update the programmable buttons based upon the preference file the preference file is passed from the host computer to the client computer.

In yet another embodiment, computer program product for of automatically updating a number of user programmable user input sensors in a client device is described. The computer program product includes computer code for generating a preference file at a host computer, computer code for passing the preference file from the host computer to the client computer, computer code for updating the programmable input sensors based upon the preference file, and computer readable medium for storing the computer code.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The invention described herein pertains to a method and apparatus that affords a user of a limited display client device the ability to customize available user inputs to perform any of a suite of user supplied functions. In one embodiment, a method of automatically updating programmable buttons on a remote client device using a set of user preferences is described. A user preference file is created on a host computer based upon those functions a user would like to execute on a remote client device (such as an MP3 player) using only available input buttons. Once the remote client device is coupled (either wired or wirelessly) to the host computer, the preference file is passed to the remote client device. The remote client device, in turn, uses the preference file to automatically update any programmable buttons included therein to execute the desired suite of functions. In some cases, a combination of buttons can be used to perform a particular function whereas in other cases, a single button can be associated with a particular function. In this way, the number of functions that can be executed by the client device can be greater than the total number of input buttons available.

In a particular embodiment, the remote client device is a pocket sized, multimedia device (personal digital assistants, personal MP3 player/recorders, and the like) having a display screen and a programmable user input device. The programmable user input device is typically includes a manually operated switch, button, wheel, or other such contrivances. Accordingly, the invention will now be described in terms a portable multimedia asset player capable of storing a number of multimedia assets. For example, in the case of the multimedia asset player being an MP3 player (such as the IPOD™ player manufactured by the Apple Computer Inc. of Cupertino, Calif.), the multimedia assets can include MP3 files as well as any other appropriately formatted data files.

Figure 1:
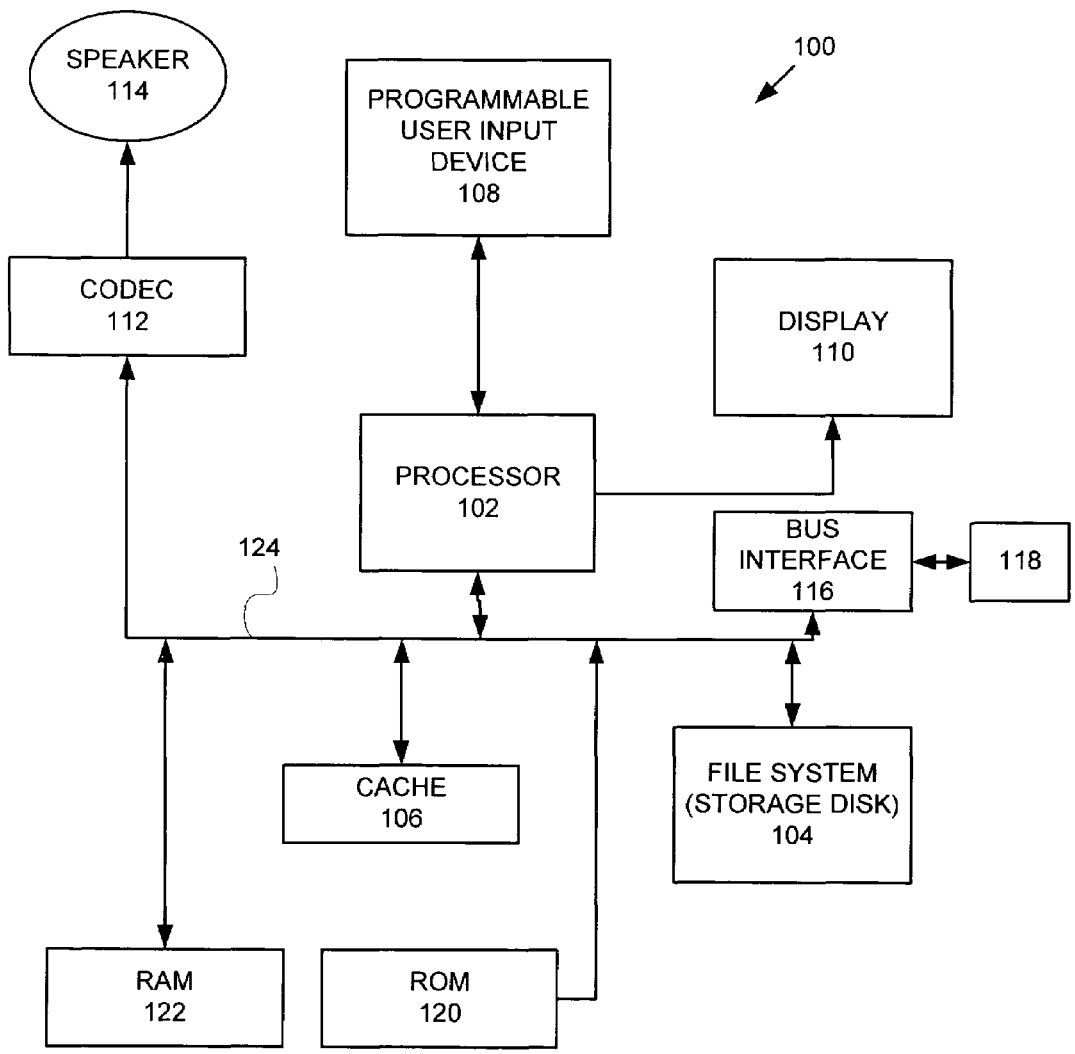
FIG. 1 shows an exemplary portable multimedia device in accordance with an embodiment of the invention.

Accordingly, FIG. 1 shows an exemplary portable multimedia device, or media player, 100 in accordance with an embodiment of the invention. The media player 100 includes a processor 102 that pertains to a microprocessor or controller for controlling the overall operation of the media player 100. The media player 100 stores media data pertaining to media assets in a file system 104 and a cache 106. The file system 104 is, typically, a storage disk or a plurality of disks. The file system 104 typically provides high capacity storage capability for the media player 100. However, since the access time to the file system 104 is relatively slow, the media player 100 can also include a cache 106. The cache 106 is, for example, Random-Access Memory (RAM) provided by semiconductor memory. The relative access time to the cache 106 is substantially shorter than for the file system 104. However, the cache 106 does not have the large storage capacity of the file system 104. Further, the file system 104, when active, consumes more power than does the cache 106. The power consumption is particularly important when the media player 100 is a portable media player that is powered by a battery (not shown). The media player 100 also includes a RAM 120 and a Read-Only Memory (ROM) 122. The ROM 122 can store programs, utilities or processes to be executed in a non-volatile manner. The RAM 120 provides volatile data storage, such as for the cache 106.

The media player 100 also includes a programmable user input device 108 that allows a user of the media player 100 to program any individual (or combination) interact with the media player 100. Still further, the media player 100 includes a display 110 (screen display) that can be controlled by the processor 102 to display information to the user. A data bus 124 can facilitate data transfer between at least the file system 104, the cache 106, the processor 102, and the CODEC 110. The media player 100 also includes a bus interface 116 that couples to a data link 118. The data link 118 allows the media player 100 to couple to a host computer.

In one embodiment, the media player 100 serves to store a plurality of media assets (e.g., songs) in the file system 104. When a user desires to have the media player play a particular media item, a list of available media assets is displayed on the display 110. Then, using the user input device 108, a user can select one of the available media assets. The processor 102, upon receiving a selection of a particular media item, supplies the media data (e.g., audio file) for the particular media item to a coder/decoder (CODEC) 110. The CODEC 110 then produces analog output signals for a speaker 114. The speaker 114 can be a speaker internal to the media player 100 or external to the media player 100. For example, headphones or earphones that connect to the media player 100 would be considered an external speaker.

In one embodiment, the media player is a portable computing device dedicated to processing media such as audio, video or images. For example, the media player 100 can be a music player (e.g., MP3 player), a game player, a video player, a video recorder, a camera, an image viewer and the like. These devices are generally battery operated and highly portable so as to allow a user to listen to music, play games or video, record video or take pictures wherever the user travels. In one implementation, the media player is a handheld device that is sized for placement into a pocket or hand of the user. By being handheld, the media player is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the users hands, no reference surface such as a desktop is needed.

Figure 2:
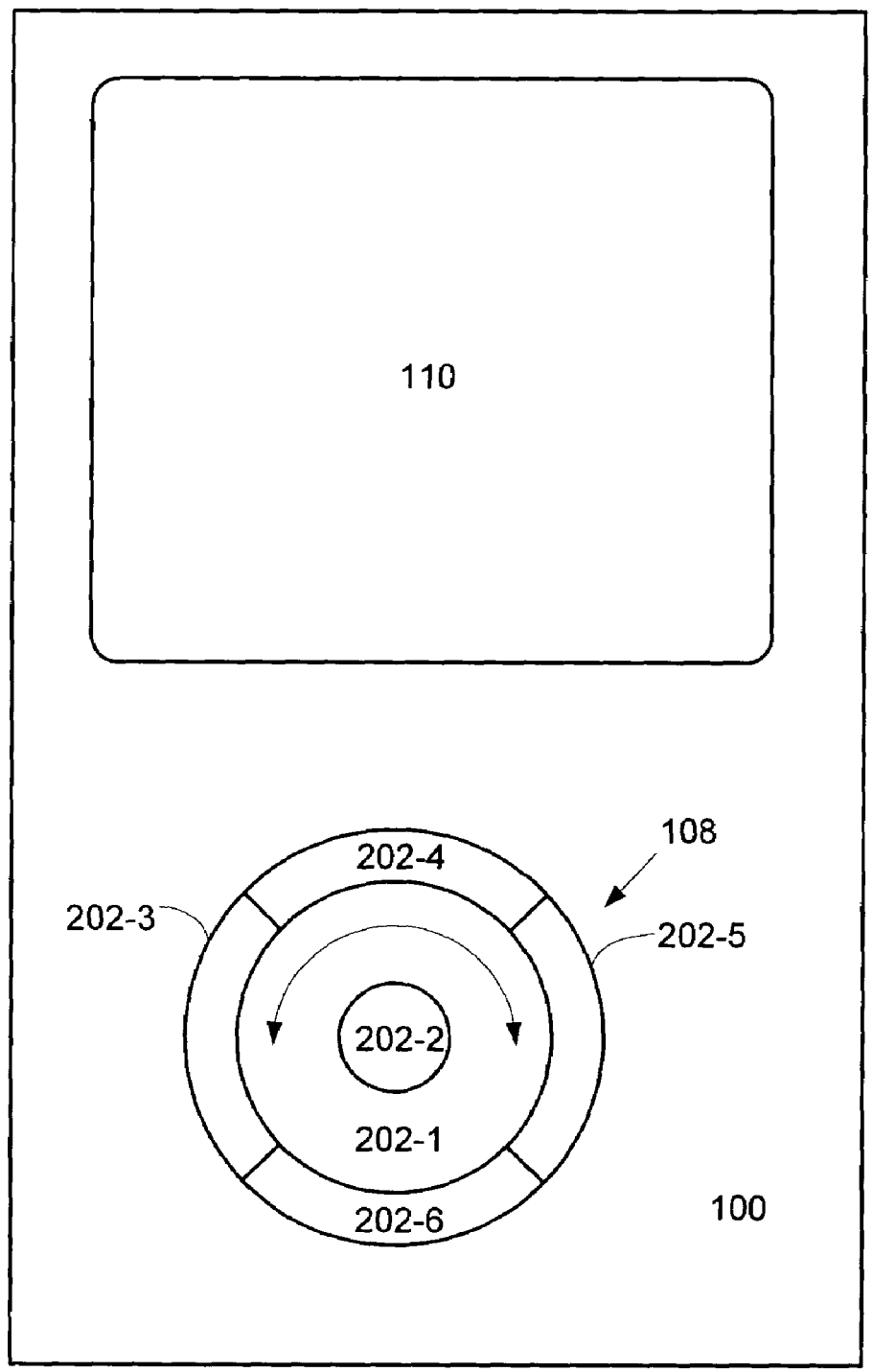
FIG. 2 illustrates a particular implementation of a programmable user input device having a number of programmable input buttons.

The programmable user input device 108 can take a variety of forms, such as a button, keypad, dial, etc. each of which can be programmed to individually or in combination to perform any of a suite of functions. FIG. 2 shows a particular implementation of the user input device 108 having a number of programmable input buttons 202. Such input buttons 202 take the form of a rotatable dial 202-1 in the form of a wheel capable of rotation in either a clockwise or counterclockwise direction having at its center an depressable input button 202-2 arranged to receive a user input event such as a press event. Other input buttons 202 include input buttons 202-3 through 202-6 each available to receive user supplied input action. It should be noted that each of the above described buttons can be programmed or otherwise configured singly or in any combination to perform a particular function or suite of functions. For example, if so desired, the rotatable dial 202-1 can be configured to associate a scroll forward function with a clockwise rotation of the dial 202-1 and a scroll back function with a counterclockwise rotation, or vice-versa. In another situation, a user can configure the dial 202-1 to scroll forward with a clockwise rotation in combination with a user supplied input event in the form of a press of the depressable button 202-2 to scroll forward in discrete steps, for example, as opposed to a continuous scroll action. In this way, a user can program any of the buttons 202 (singly or in any combination) to perform any function.

Figure 3:
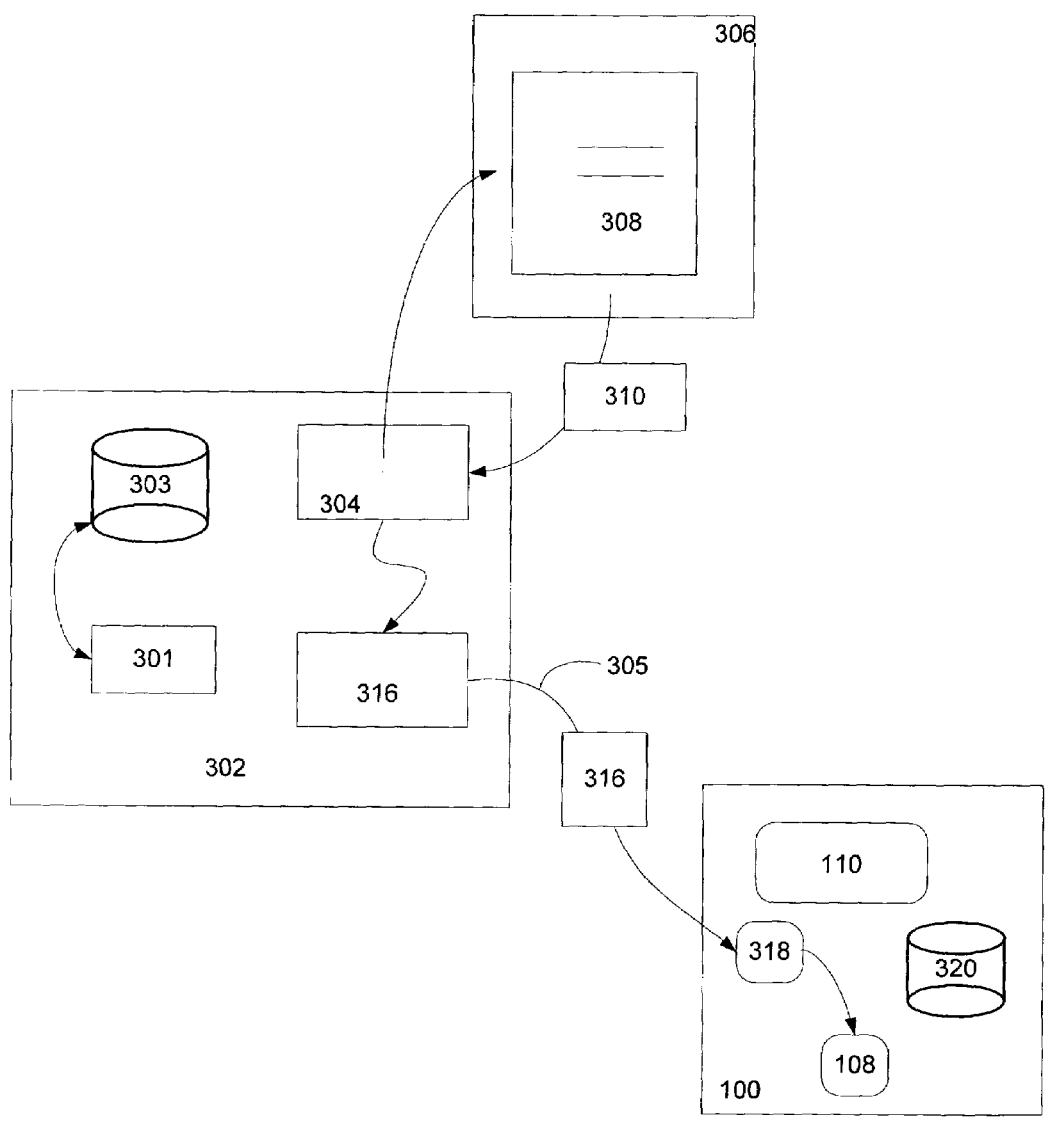
FIG. 3 shows a system arranged to update any of a number of available input buttons to perform a suite of user selected functions in accordance with an embodiment of the invention.

However, in some cases, a user may wish to update the functions performed by the various buttons to reflect a particular set of functions that the user would like to execute. This updating can be accomplished using a system 300 illustrated in FIG. 3 in accordance with an embodiment of the invention. The system 300 includes a host computer 302 coupled (either wirelessly or wired) to the player 100 having the programmable input device 108 described above. The personal computer 302 includes a media manager 301 and a user preference module 304. The media manager 301 enables a user of the personal computer 302 to manage media content stored on the personal computer 302 in, for example, a retrievable storage medium 303. For example, the media manager 301 facilitates a user with browsing, organizing, or other operations with respect to media content (e.g., numerous media items). A communications link 305 couples the host computer 302 to the media player 100. In some cases, the communications link 305 takes the form of a wired link such as a peripheral cable that couples the media player 100 to the personal computer 302. Typically, the peripheral cable couples together data ports provided on the media player 100 and the personal computer 302. In one example, the data ports can be FIREWIRE ports and the peripheral cable can be a FIREWIRE cable. More generally, the peripheral cable acts as a data link. Media items can be transferred from the media player 100 to the personal computer 302 over the peripheral cable, and vice versa. In other cases, the communications link 305 takes the form of a wireless link.

In order to update the functions performed by the programmable input device 108, the user preference module 304 (that can take any number of forms such as software module or hardware module) generates a graphical user interface (GUI) 306 that includes, for example, a user input section 308. In the described embodiment, the GUI 306 is displayed on a display unit coupled to the host computer 302 in such a way that the user can associate various functions with a particular one (or group) of buttons associated with the programmable input device 108.

Once the user has selected the appropriate set of functions and corresponding input button(s), the information 310 is passed back to the preference module 304 that, in turn, generates a preference file 316. At this point, a determination is made whether or not the player is coupled to the host computer 302 and if so, the current state of the programmable input device 108 is ascertained. In this way, if the current state of the programmable input device 108 matches the preference file 316, then no further updating occurs, otherwise, the updating of the programmable input device 108 takes place by passing the preference file 316 by way of the communications link 305 from the host computer 302 to the player 100. Once the preference file 316 has been passed to the player 100, a preference programming module 318 included in or coupled to the programmable input device 108 programs the various input buttons 202 based upon the preference file 316. In one embodiment, the preference file 316 includes a button map that maps each of the functionalities to at least one of the programmable buttons. In this way, the various input buttons 202 are programmed to execute the function(s) in any combination or manner based upon the preference file.

Although described in terms of a manual updating operation, the programmable buttons can also be configured automatically during what is referred to as a synchronization operation. Synchronization operations have been conventionally performed between portable devices, such as Personal Digital Assistants (PDAs) and host computers, to synchronize electronic files or other resources. In the case of media players, such as MP3 players, during synchronization, MP3 files are typically moved between a host computer and a media player through use of a drag and drop operation, as is conventionally done with respect to copying of a data file from a Windows desktop to a floppy disk. In this way, the media player is updated with regard to the number and type of media files available to the media player. For example, if a user has updated a particular play list on a host computer, the media player can also be updated to reflect the latest version of the play list. In addition to updating the particular play list or media files, a programmable button preference file can be associated with the play list or media file such that when the player is synchronized, the particular preference file is also used to update the programmable buttons. In this way, each play list (or media file for that matter) can have associated with it a particular suite of functions expressed by the programmable buttons.

A synchronization operation between the media content stored on the personal computer 302 (in the storage medium 303, for example) and the media content stored on the media player 100 (in, for example, the RAM 122 or cache 106 or a media/preference file data base 320) can be achieved in a sophisticated manner through comparison of media information stored in the respective media databases. When comparison of the information from the respective databases indicates that there is a particular media item (or associated preference file) resident on the personal computer 302 but not on the media player 100, then the particular media item (or its associated preference file)) can be transmitted (downloaded) to the media player 100 over the communications link. On the other hand, when the comparison of the information from the respective databases indicates that a particular media item (or its associated preference file) is resident on the media player 100 but not on the personal computer 302, then the particular media item (or its associated preference file) can be either removed (deleted) from the media player 100 or transmitted (e.g., uploaded) over the communications link 305 to the personal computer 302. Hence, by providing the media player 100 with a media/preference file database 320, more sophisticated synchronization and management of media content (and any associated preference files) is enabled.

The media/preference file database 320 also allows the media player 100 to present a user interface to the user that is more sophisticated then conventional approaches. Such a user interface can be presented on the screen display of the media player 100. The user interface can, for example, allow the user of the media player 100 to browse, sort, search, play, etc. the media content resident on the media player 100 using the functions programmed into the programmable input button 108 using the associated preference file. The user interface can also allow the user of the media player 100 to download (add) or delete (remove) media items from the media player 100. The media manager 301 also has a user interface that allows a user to browse, sort, search, play, make play lists, burn Compact Discs (CDs), etc. the media content resident on the personal computer 302. The user interface can also allow the user of the personal computer 302 to download (add) or delete (remove) media items from the personal computer 302. In one embodiment, the media manager 301 and its associated user interface are provided by iTunes, version 2.0, from Apple Computer, Inc. of Cupertino, Calif.

Figure 4:
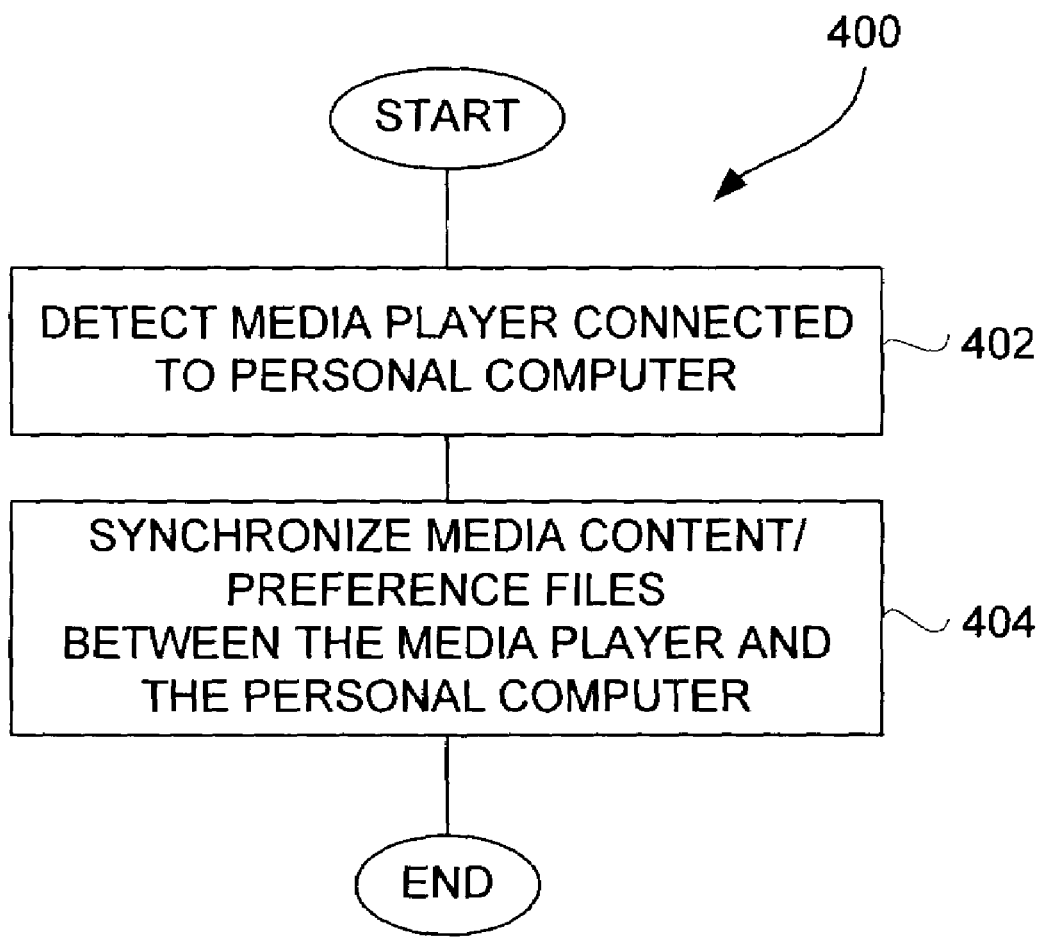
FIG. 4 is a flow diagram of media manager processing according to one embodiment of the invention.

FIG. 4 is a flow diagram of media manager processing 400 according to one embodiment of the invention. The media manager processing 400 is, for example, performed by the media manager 301 illustrated in FIG. 3.

The media manager processing 400 initially detects 402 a media player connected to a personal computer (host computer). Here, when a media player is connected to the personal computer, a synchronization operation can be performed to synchronize the media content and any associated preference files between the media player and the personal computer. After the media player has been detected as being connected to the personal computer, the media content and any associated preference files between the media player and the personal computer can be synchronized 404. The synchronization can be performed in a one-way manner or in a two-way manner. In a preferred embodiment, the synchronization is one-way from the personal computer to the media player. In another embodiment, the synchronization can be one-way from the media player to the personal computer. In still another embodiment, the synchronization can be two-way from the media player to the personal computer as well as from the personal computer to the media player. In any case, the media player typically has less media storage capacity than the personal computer and thus may limit the extent of the synchronization that can be performed. In this way, a preference file can be passed from the media player back to the host computer so as to provide a mechanism whereby the particular preference file can be made available to other media players coupled to (presently or in the future) to the host computer.

It should be noted that the synchronization processing can be performed manually assuming that a media player has already been detected 402 or automatically upon such detection. In the case of automatic synchronization following detection 402 of the connection, synchronization is performed without a user interacting with any buttons or user interface elements, that is, the connection itself initiates the synchronization.

Figure 5:
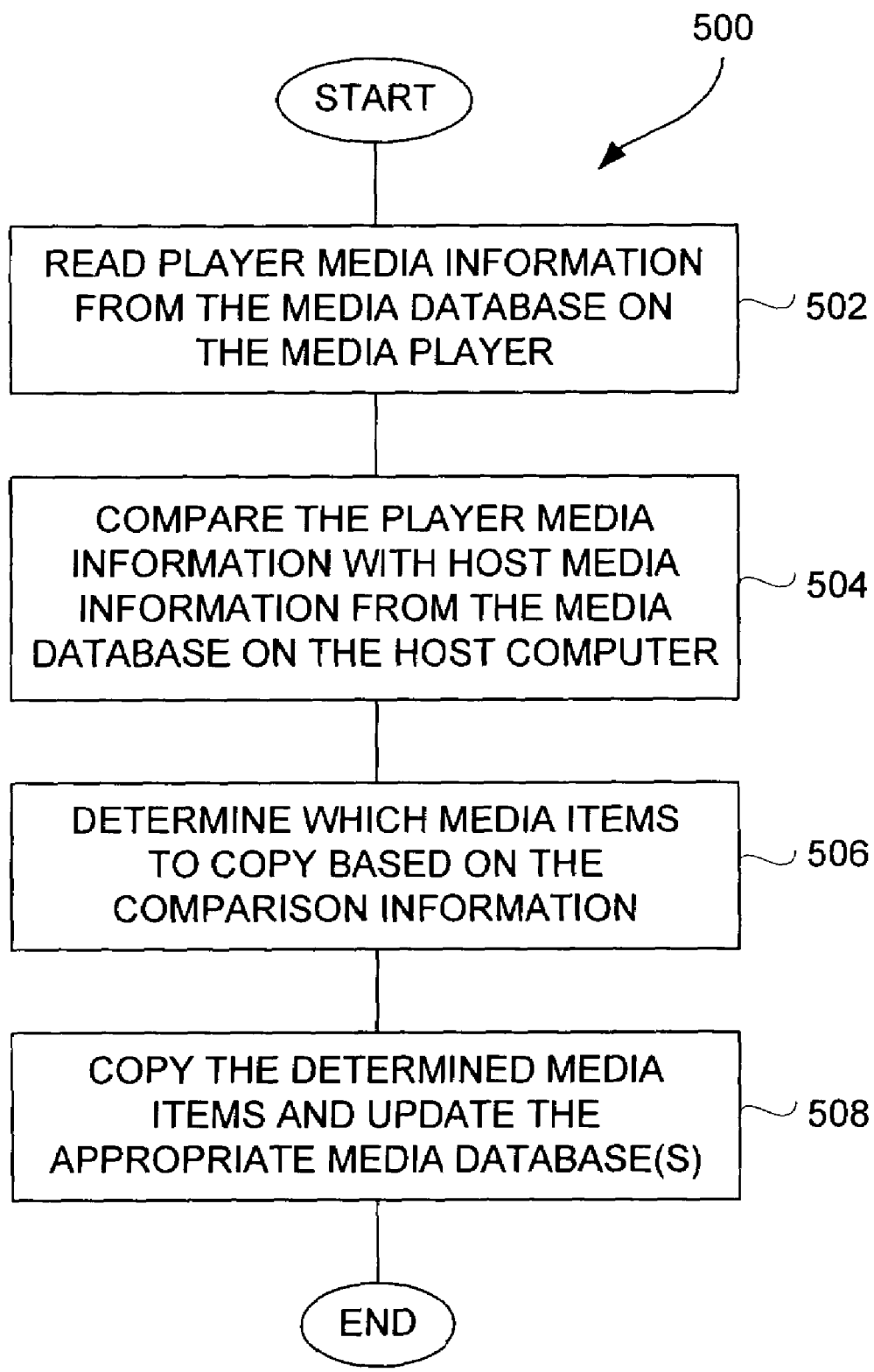
FIG. 5 is flow diagram of synchronization processing according to one embodiment of the invention.

FIG. 5 is flow diagram of synchronization processing 500 according to one embodiment of the invention. The synchronization processing 500 is, for example, performed by a host computer, such as the personal computer 302 illustrated in FIG. 1. More specifically, the synchronization processing 500 is performed by the media manager 301 illustrated in FIG. 3.

The synchronization processing 500 initially reads 502 player media information from a media/preference file database on a media player. Next, the player information is compared 504 with first media/preference file information from a media/preference file database on a host computer. Such comparison produces comparison information concerning differences between the player information and the host information. Next, the synchronization processing 500 determines 506 one or more media items to copy between the host computer and the media player based on the comparison information. For example, media items (e.g., audio files for songs) can be compared using media information such as song title, album name and/or artist name which pertain to characteristics or attributes of the media items. On the other hand, programmable button functionality can be compared using preference data on the media player and that associated with a particular media file or files. Thereafter, the determined one or more media items are copied 508 and the appropriate media/preference file database(s) are updated. Following the operation 508, the synchronization processing 500 is complete and ends.

According to one embodiment, the comparison of player media information and host media information is performed using media attributes of the various media items as well as any associated programmable button preference file. Namely, a media item on the media player can be deemed the same media item as resident on the host computer if its media attributes sufficiently match. Examples of media attributes include title, album, track, artist, composer and genre. These attributes are particular to a particular media item. In addition, other media attributes can pertain to quality characteristics of the media item. Examples of such media attributes include bit rate, sample rate, equalization setting, volume adjustment, start/stop and total time as well as associated preference file(s). Hence, in one embodiment, if the above-identified media attributes pertaining to a media item on the media player all match those same media attributes pertaining to a media item on the host computer, then the two media items stored on different devices can be deemed the same even though still further attributes or characteristics may cause these media items to not be exact duplications of one another. For example, if modification dates associated with respective files storing the media items were different, this difference in modification date would not trigger the copying of such media items from the host computer to the media player when the above-identified media attributes match. However, if the programmable button preference files do not match, then only the programmable button preference files are updated.

Hence, the intelligence of the synchronization processing of the invention allows the amount of data transfer to be properly managed such that it is relatively low or minimized. Although conventional approaches are able to transfer files from a host computer to a portable device, when dealing with media items, filenames and modification dates tend not to be reliable indicators of whether data transfer needs to be transferred (i.e., copied). As a result, using conventional data transfer techniques with respect to media items results in slow and inefficient operation and thus tends to present an unsatisfactory user experience.

Although the synchronization processing 500 makes use of media databases at the host computer and the media player, in another embodiment the needed host media information and the player media information can be gathered from the media items themselves. In one implementation, such media information can be acquired from metadata provided with the media items. However, by providing the media databases, synchronization is able to be performed more efficiently and quickly.

Figure 6A:
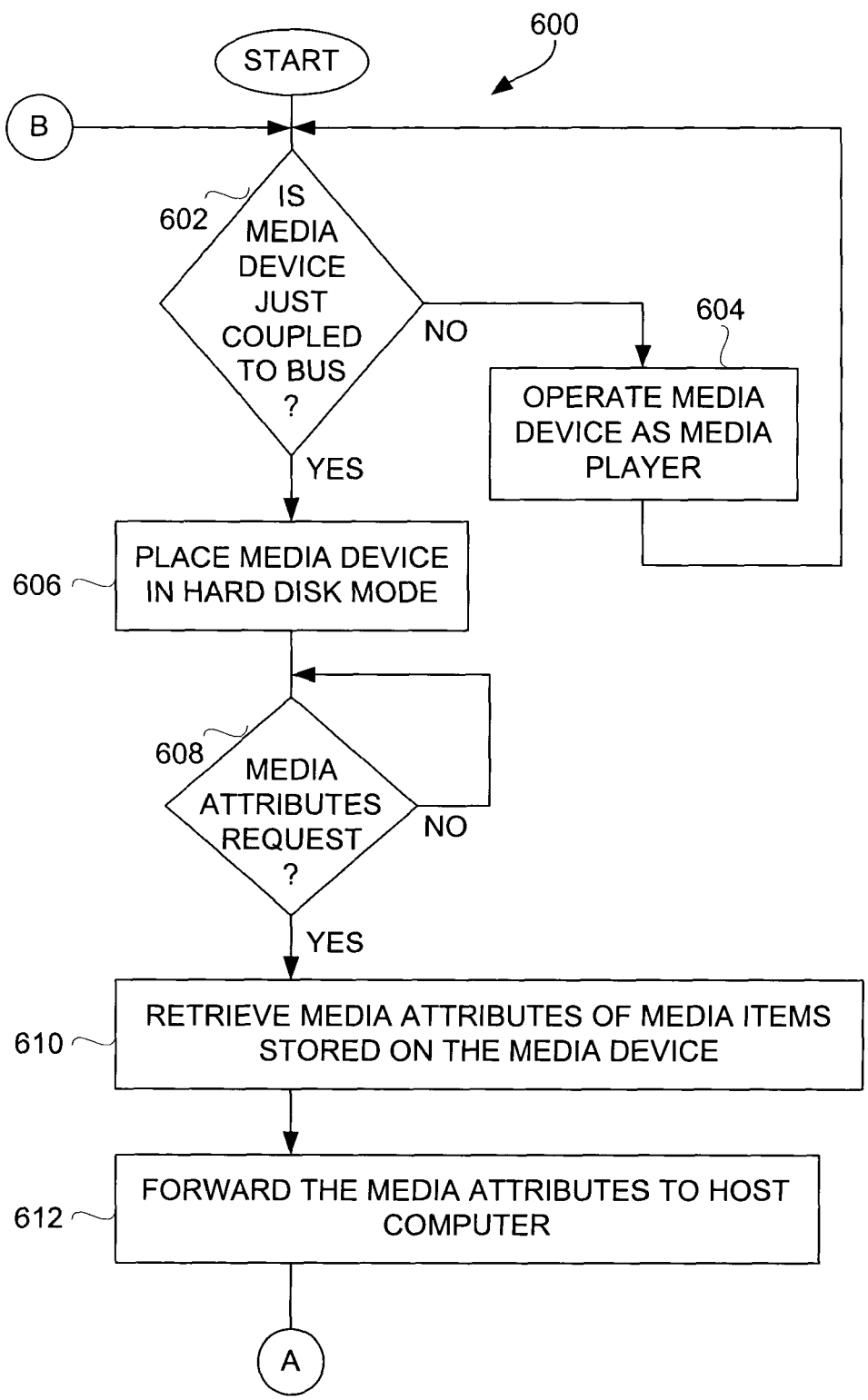
FIGS. 6A and 6B illustrate media device synchronization processing according to one embodiment of the invention.
Figure 6B:
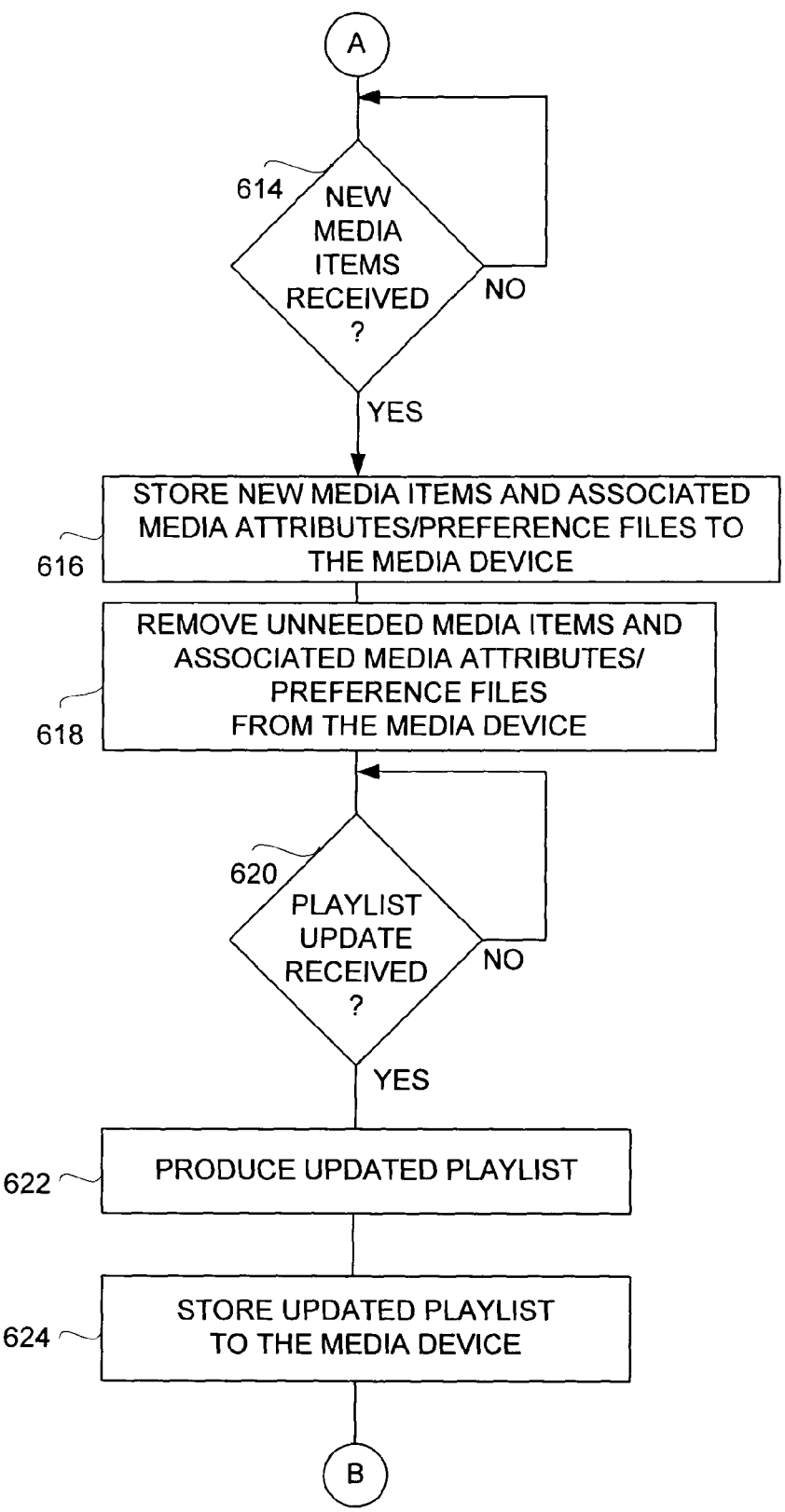

FIGS. 6A and 6B illustrate media device synchronization processing 600 according to one embodiment of the invention. The media device synchronization processing 600 is performed by a media device that interacts with a host computer over a network. For example, the media device can pertain to the media player 100 illustrated in FIG.

The media device synchronization processing 600 is generally operative on the media device when the media device is powered-on. Initially, a decision 602 determines whether the media device has just been coupled to a bus. The decision 602 can be performed periodically to check for a recent connection to a bus or can be triggered by hardware detection of connection to a bus. The bus is a communication bus coupled to the host computer. In one embodiment, the bus is a serial bus such as FIREWIRE or Universal Serial Bus (USB). When the decision 602 determines that the media device has not just been coupled to a bus, then the media device is operated 604 as a media player. In such a mode, the media device operates to browse, search or play media items for its user. The media items can be audio items (e.g., songs). Following the operation 604, the media device synchronization processing 600 returns to repeat the decision 602 and subsequent operations.

On the other hand, when the decision 602 determines that the media device has just been coupled to the bus, then the media device is placed in a hard disk mode 606. In the hard disk mode, the media device acts as an external hard drive to the host computer. A decision 608 then determines whether the host computer has requested media and or programmable button attributes for the media items residing on the media device. When the decision 608 determines that the host computer is not requesting media and or programmable button attributes, the media device can, but need not, perform other hard drive operations for non-synchronization purposes (not shown). When the decision 608 determines that the host computer is requesting media and or programmable button attributes (i.e., such as through a read operation), then the media and or programmable button attributes of the media items stored on the media device are retrieved 610. After the media and or programmable button attributes are retrieved 610, the media attributes are forwarded 612 to the host computer.

Next, a decision 614 determines whether new and or programmable button attributes has been received at the media device from the host computer. In other words, in an effort to synchronize the media content and or programmable button attributes residing on the media device with the media content and or programmable button attributes residing at the host computer, the media device will often receive media content from the host computer. Hence, the decision 614 determines whether new media items and or programmable button attributes have been or are presently being received. When the decision 614 determines that such new media items and or programmable button attributes have not been received, then the media device synchronization processing 600 can await such new media items and or programmable button attributes. While waiting for new media items and or programmable button attributes, the media device can, but need not, perform other hard drive operations for non-synchronization purposes (not shown). More generally, other hard disk operations can occur concurrently with synchronization operations. On the other hand, when the decision 614 determines that new media items and or programmable button attributes have been received from the host computer, then the new media items and their associated media attributes and or programmable button attributes are stored 616 to the media device. In one embodiment, the new media items and or programmable button attributes are stored to files in the media device, and the associated media attributes and or programmable button attributes pertaining to the media items are stored in a media database residing on the media device. Additionally, any unneeded media items and their associated media attributes and or programmable button attributes can be removed 618 from the media device. Hence, in this embodiment, by synchronizing the media content and or programmable button attributes residing on the media device with that on the host computer, new media items and or programmable button attributes are not only stored to the media device, but unneeded (e.g., old) media items and their associated media attributes and or programmable button attributes are also removed from the media device.

Following the operation 618, a decision 620 determines whether a play list update has been received. When the decision 620 determines that a play list update has not been received, then the media device synchronization processing 600 can await such a play list update. Alternatively, when the decision 620 determines that a play list update has been received, then an updated play list for the media device is produced 622. The play list update could be the updated play list or could be instructions to update an existing play list. The updated play list is then stored 622 to the media device.

In effect, one or more play lists at the host computer can be synchronized with the media device and thus made available to the media device. A play list identifies particular media items that are to be played in a sequence. Internally, the play list can be represented in the media database as a data structure that points to files of the appropriate media items residing on the storage device within the media device. Hence, for a given play list, the pointers to the files of the appropriate media items on the media device will differ from the pointers to the files for the same media items on the host computer, thus the need to update the pointers if a particular play list is moved between the host computer and the media device.

Figure 7A:
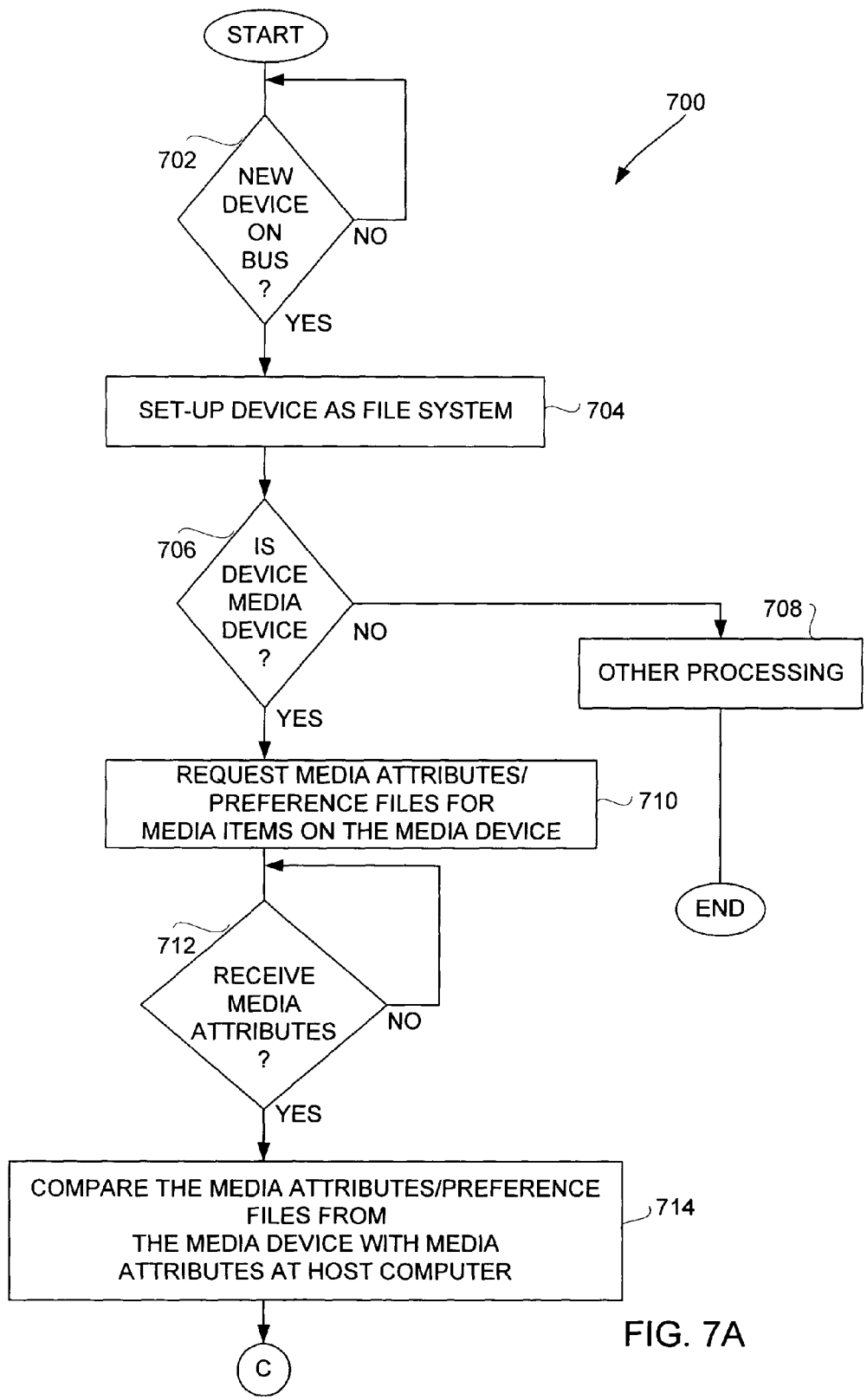
FIGS. 7A and 7B are flow diagrams of host computer synchronization processing according to one embodiment of the invention.
Figure 7B:
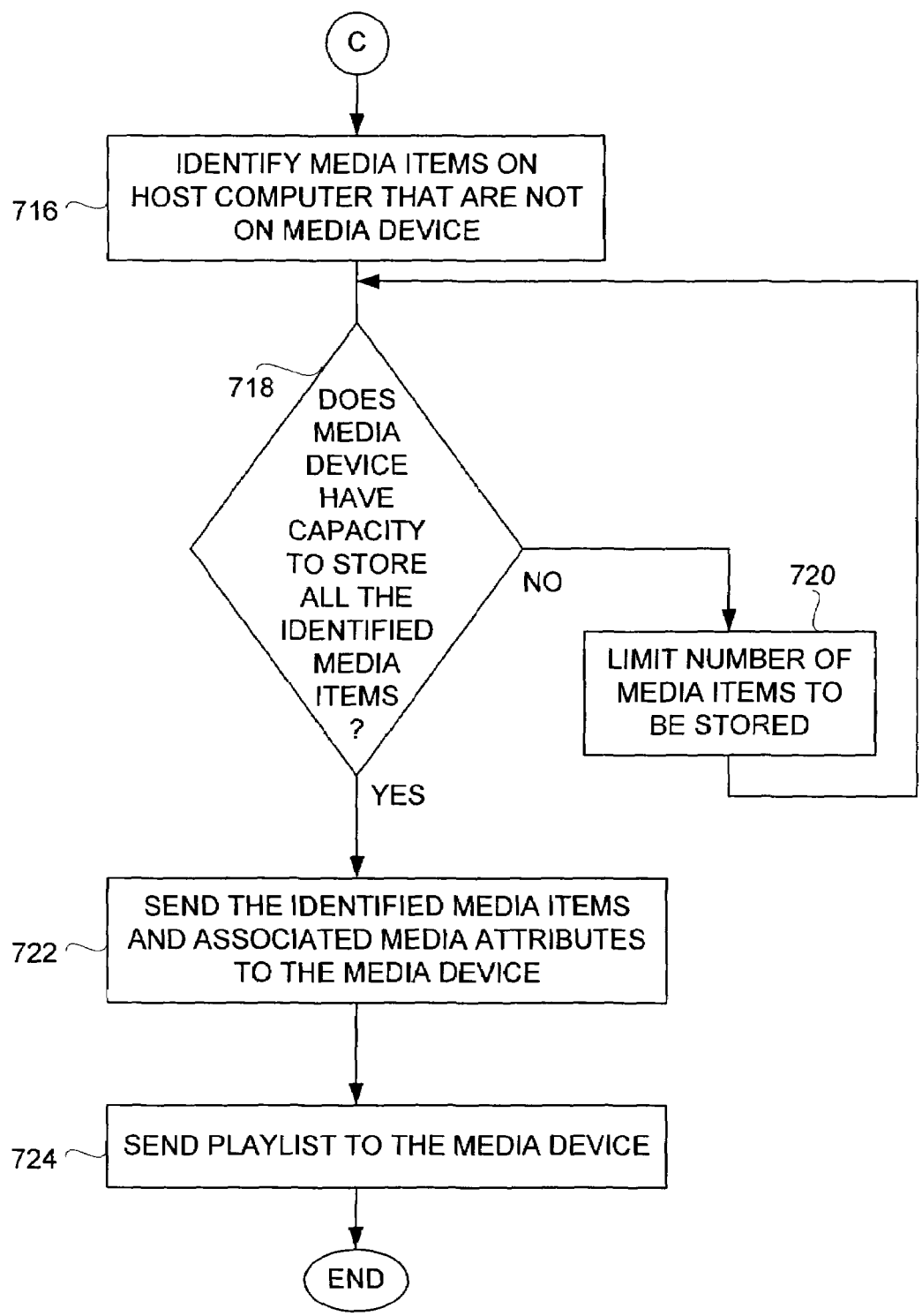

FIGS. 7A and 7B are flow diagrams of host computer synchronization processing 700 according to one embodiment of the invention. The host computer synchronization processing 700 is, for example, performed by a host computer. The host computer can, for example, be the personal computer 104 illustrated in FIG. 1.

The host computer synchronization processing 700 begins with a decision 702 which monitors a bus (i.e., peripheral bus) to determine whether any new devices have been attached. In one implementation, the monitoring is limited to a particular category of devices (e.g., FIREWIRE devices). Such monitoring can, for example, be performed by polling the device(s) on the bus or by receiving a new device alert. When the decision 702 determines that no new devices have been attached to the bus, then the host computer synchronization processing 700 awaits the presence of a new device. Once the decision 702 determines that a new device is present on the bus, then the device is set up 704 as a file system with respect to the host computer. As such, an operating system for the host computer is able to access (read, write and delete) files with respect to the file system (i.e., the new device).

Next, a decision 706 determines whether the device that is now present on the bus is a media device. When the decision 706 determines that the device is not a media device, then other processing 708 can be performed. Such other processing 708 is unrelated to synchronization processing and thus not further described herein. Following the other processing 708, the host computer synchronization processing 700 is complete and ends with synchronization not having been performed.

On the other hand, when the decision 706 determines that the device is a media device, then media attributes and or programmable button attributes for media items on the media device are requested 710. Typically, the media attributes and or programmable button attributes for all the media items residing on the media device would be retrieved. A decision 712 then determines whether the media attributes and or programmable button attributes have been received. When the decision 712 determines that the media attributes and or programmable button attributes have not yet been received, then the host computer synchronization processing 700 can await their receipt. Once the decision 712 determines that the media attributes and or programmable button attributes have been received, then the media attributes and or programmable button attributes from the media device are compared 714 with media attributes and or programmable button attributes for the media items residing on the host computer. Here, the comparison 714 of media attributes and or programmable button attributes with respect to the media device and the host computer results in comparison information. The comparison information indicates directly or indirectly which media items and or programmable button attributes are present at the host computer but not present at the media device as well as which media items and or programmable button attributes are present at the media device but not present at the host computer. Following the comparing 714, the media items and or programmable button attributes on the host computer that are not on the media device are identified 716.

Next, a decision 718 determines whether the media device has the capacity to store all the identified media items and or programmable button attributes. Here, the decision 718 determines whether the media device has sufficient storage capacity to store the one or more media items and or programmable button attributes that have been identified 716 as on the host computer but not on the media device. When the decision 718 determines that the media device does not have sufficient capacity, then the number of media items and or programmable button attributes to be stored is limited 720. There are numerous ways to limit the number of media items and or programmable button attributes to be stored. For example, one or more of the media items and or programmable button attributes to be stored can be unidentified such that it is not to be stored to the media device. The one or more media items and or programmable button attributes to be unidentified can be chosen in a variety of different ways. For example, the one or more items to be unidentified could be randomly selected, selected based on file size, selected based on position in play list, etc. Following the operation 720, the host computer synchronization processing 700 returns to repeat the decision 718 and subsequent operations.

When the decision 718 determines that the media device has sufficient capacity to store all of the identified media items and or programmable button attributes, the identified media items and their associated media attributes and or programmable button attributes are sent to the media device. Here, the remaining identified media items and their associated media attributes and or programmable button attributes are sent (i.e., copied) from the host computer to the media device where they are to be stored. A play list can also be sent 724 to the media device. The play list can represent a new play list or an updated version of a previously existing play list. Before sending 724 the play list to the media device, the play list can be modified for use on the media device. Alternatively, the media device itself could update the play list for use on the media device.

Additionally, although not illustrated in FIGS. 7A and 7B, according to another embodiment, the host computer synchronization processing 700 at operation 714 can also identify those of the media items and or programmable button attributes on the media device that are not on the host computer. Then, the host computer can operate to interact with the media device to remove (e.g., delete) those media items and or programmable button attributes stored on the media device that are not stored at the host server. Such additional processing would be performed after the operation 716 and prior to the decision 718 so that the storage capacity of the media device can be fully utilized.

The media device synchronization processing 600 and the host computer synchronization processing 700 interact to synchronize media items and or programmable button attributes on the media device to those media items and or programmable button attributes on the host computer. Such synchronization can consider all media items and or programmable button attributes or can be limited to synchronizing only a subset of media content, such as media items pertaining to one or more play lists, or programmable button attributes. The media attribute comparison provided by the invention is facilitated through the use of databases, both on the host computer and on the media device.

In one implementation, the host computer synchronization processing 700 can utilize an application resident on the host computer to perform the comparison and updating of the media items and their attributes between the host computer and the media device. One such application is iTunes, version 2.0, produced by Apple Computer, Inc. of Cupertino, Calif.

Figure 8:
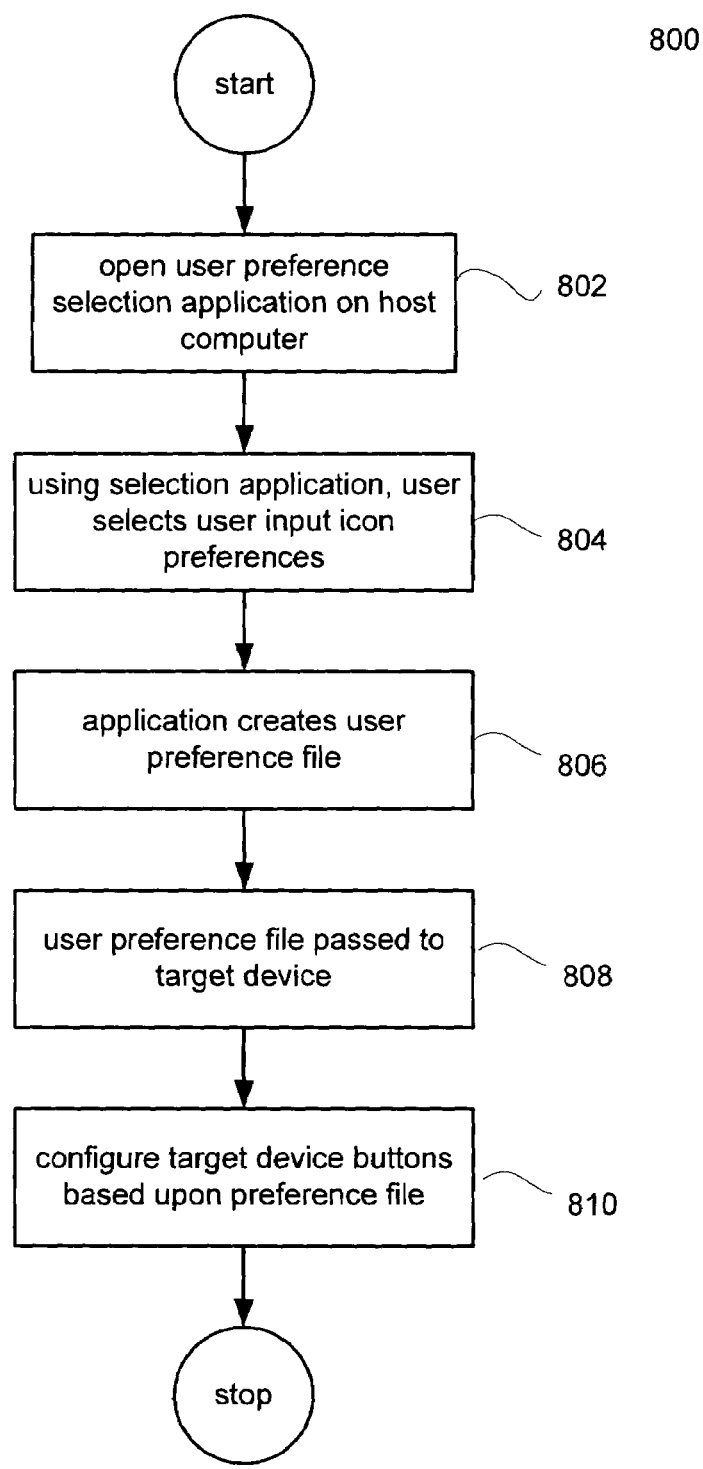
FIG. 8 shows a flowchart detailing a manual updating procedure in accordance with an embodiment of the invention.

FIG. 8 shows a flowchart detailing a manual updating procedure 800 in accordance with an embodiment of the invention. Accordingly, the manual updating includes open user preference selection application on host computer at 802 and using the selection application, a user selects user input icon preferences at 804. At 806, the application creates user preference file while at 808 the user preference file passed to target device. At 810, configure target device buttons based upon preference file.

Figure 9:
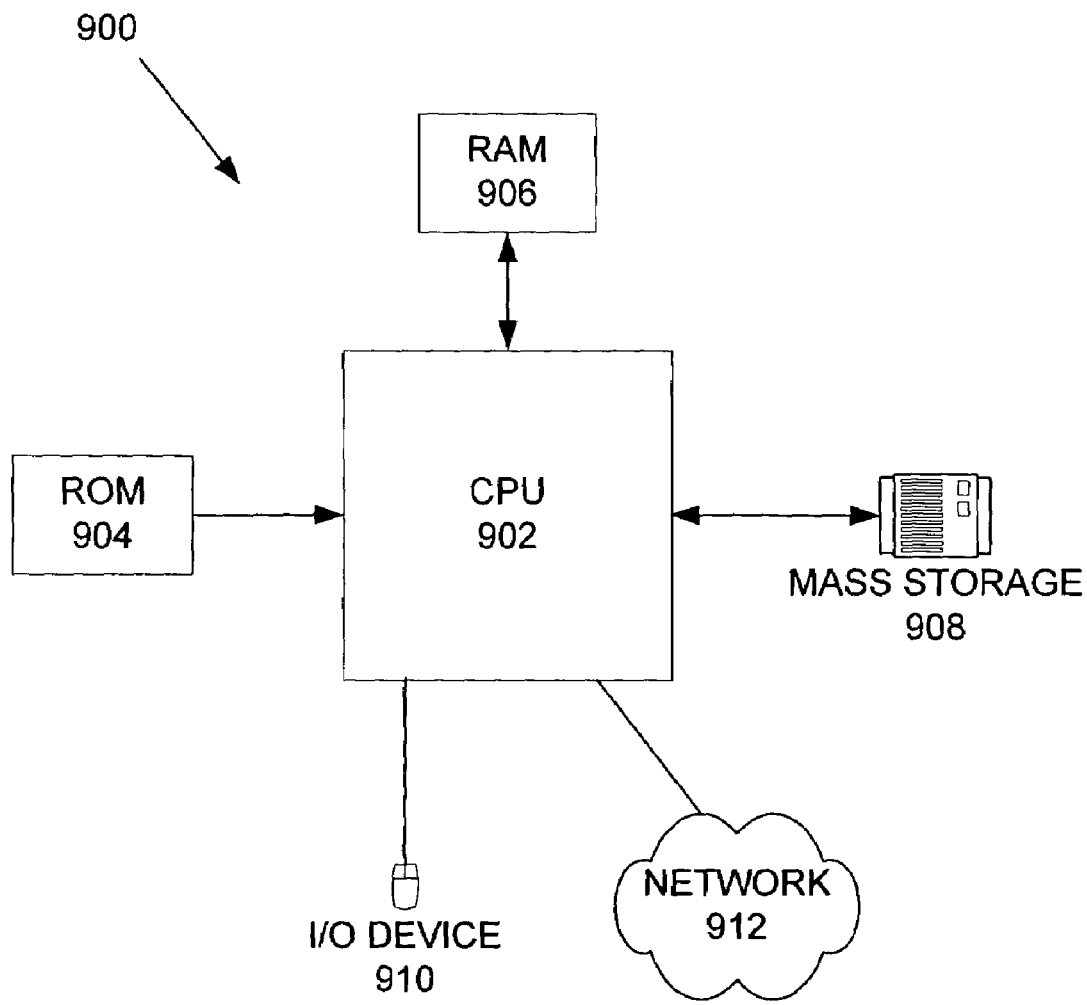
FIG. 9 illustrates a computer system employed to implement the invention.

FIG. 9 illustrates a computer system 900 employed to implement the invention. The computer system 900 or, more specifically, CPU 902, may be arranged to support a virtual machine, as will be appreciated by those skilled in the art. As is well known in the art, ROM acts to transfer data and instructions uni-directionally to the CPU 902, while RAM is used typically to transfer data and instructions in a bi-directional manner. CPU 902 may generally include any number of processors. Both primary storage devices 904, 906 may include any suitable computer-readable media. A secondary storage medium 908, which is typically a mass memory device, is also coupled bi-directionally to CPU 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPU 902.

CPU 902 are also coupled to one or more input/output devices 910 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network, e.g., an Internet network or an intranet network, using a network connection as shown generally at 912. With such a network connection, it is contemplated that the CPU 902 might receive information from the network, or might output information to the network in the course of performing the above-described method steps. Such information, which is often represented as a sequence of instructions to be executed using CPU 902, may be received from and outputted to the network, for example, in the form of a computer data signal embodied in a carrier wave. The above-described devices and materials will be familiar to those of skill in the computer hardware and software arts.

The various aspects or features of the invention described above can be used alone or in various combinations.

Although the media items of emphasis in several of the above embodiments where audio items (e.g., audio files or songs), the media items are not limited to audio items. For example, the media item can alternatively, pertain to videos (e.g., movies) or images (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that a user is able to synchronize a media player with a host computer in a more sophisticated manner. Another advantage of the invention is that the amount of data transfer required for synchronization is reduced thus enabling faster synchronization. Still another advantage of the invention is that synchronization can be automatically initiated and performed upon connection of a media player to a host computer.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of automatically updating a number of user programmable input sensors in a client device, comprising:
   generating a host preference file at a host computer, wherein the host preference file includes information relating to the functionality of the user programmable input sensors;
   passing the host preference file from the host computer to the client device when the host computer is coupled to the client device; and
   automatically updating only those user programmable input sensors in the client device that are different than the host preference file, wherein the user programmable input sensors remain updated whether or not the client device and host computer are coupled with each other.

2. A method as recited in claim 1, wherein the programmable input sensors are each a user programmable button wherein each of the programmable buttons are suitable for receiving a user supplied input event.

3. A method as recited in claim 1, wherein the generating comprises:
   providing a preference file that includes,
      a set of desired functionalities, and
      a button map that maps each of the functionalities to at least one of the programmable buttons.

4. A method as recited in claim 3, wherein the updating comprises:
   mapping the functionalities to the at least one of the programmable buttons or a combination of programmable buttons.

5. A method as recited in claim 1, wherein the host computer and the client device are wirelessly coupled and wherein the passing is a wireless transmission.

6. A method as recited in claim 1, wherein the host computer and the client device are coupled by way of a connector cable.

7. A method as recited in claim 1, wherein the preference file is stored in a computer readable medium and wherein the preference file is passed from the host computer to the client device by way of the computer readable medium.

8. A method as recited in claim 1, wherein the client device is a thin client device that includes a small display screen.

9. A method as recited in claim 8, wherein the client device is a cellular telephone or a Personal Digital Assistant (PDA) or paging device or a MP3 player.

10. A method as recited in claim 1, wherein a combination of more than one of the updated programmable input sensors can be used simultaneously to perform a single function such that a total number of functions executed by the programmable input sensors is greater than the number of user programmable input sensors.

11. A thin client device arranged to be coupled to a host computer suitably configured for storing any of a number of appropriately formatted data files, comprising:
   a display unit for displaying selected graphical data;
   a processor coupled to the display unit for executing selected instructions;
   a user interface coupled to the processor having a number of programmable input sensors arranged to receive user supplied input events;

a user interface programming unit coupled to the user interface arranged to selectively program selected ones of the programmable input sensors;

a host interface for receiving a host preference file from the host computer, wherein the host preference file is used to automatically update only those user programmable input sensors in the client device that are different than the host preference file when the host computer is coupled to the client device, wherein the programmable input sensors remains programmed whether or not the thin client device and the host computer are coupled with each other.

12. A thin client as recited in claim 11 wherein the preference file includes a set of desired functionalities, and a button map that maps each of the functionalities to at least one of the programmable input sensors.

13. A device as recited in claim 11, wherein a combination of more than one of the updated programmable input sensors can be used simultaneously to perform a single function such that a total number of functions executed by the programmable input sensors is greater than the number of user programmable input sensors.

14. A system arranged to automatically update a number of user programmable input sensors in a client device when the client device is coupled to a host computer, comprising:
a host preference file generator coupled to the host computer arranged to provide a host preference file that includes information relating to the functionality of the user programmable input sensors; and
a programmable input sensor programming unit configured to automatically update only those user programmable input sensors in the client device that are different than the host preference file when the host computer is coupled to the client device, wherein the user programmable input sensors remain updated whether or not the client device and host computer are coupled with each other.

15. A system as recited in claim 14, wherein each of the programmable buttons are suitable for receiving a user supplied input event.

16. A system as recited in claim 14 further comprising:
a preference file that includes,
a set of desired functionalities, and
a button map that maps each of the functionalities to at least one of the programmable buttons.

17. A system as recited in claim 16, further comprising: wherein the functionalities are mapped to the at least one of the programmable buttons or a combination of programmable buttons.

18. A system as recited in claim 14, wherein the host computer and the client device are wirelessly coupled and wherein the passing is a wireless transmission.

19. A system as recited in claim 14, wherein the host computer and the client device are coupled by way of a connector cable.

20. A system as recited in claim 14, wherein the preference file is stored in a computer readable medium and wherein the preference file is passed from the host computer to the client device by way of the computer readable medium.

21. A system as recited in claim 14, wherein the client device is a thin client device that includes a small display screen.

22. A system as recited in claim 21, wherein the client device is a cellular telephone or a Personal Digital Assistant (PDA) or paging device or a MP3 player.

23. A system as recited in claim 14, wherein a combination of more than one of the updated programmable input sensors can be used simultaneously to perform a single function such that a total number of functions executed by the programmable input sensors is greater than the number of user programmable input sensors.

24. Computer program product for automatically updating a number of user programmable input sensors in a client device when the client device is coupled to a host computer, comprising:
computer code for generating a host preference file at the host computer;
computer code for automatically passing the host preference file from the host computer to the client device when the client device is coupled to the host computer;
computer code for automatically updating only those user programmable input sensors in the client device that are different than the passed host preference file, thereby updating the programmable input sensors, wherein the programmable input sensors remain updated whether or not the client device and host computer are coupled with each other; and
computer readable medium for storing the computer code.

25. Computer program product as recited in claim 24, wherein the programmable input sensors are each a user programmable button wherein each of the programmable buttons are suitable for receiving a user supplied input event.

26. Computer program product as recited in claim 24, wherein the computer code for generating further comprises:
computer code for providing a set of desired functionalities; and
computer code for providing a button map that maps each of the functionalities to at least one of the programmable buttons.

27. Computer program product as recited in claim 26, wherein the computer code for updating further comprises:
computer code for mapping the functionalities to the at least one of the programmable buttons or a combination of programmable buttons.

28. Computer program product as recited in claim 24, wherein the host computer and the client device are wirelessly coupled and wherein the passing is a wireless transmission.

29. Computer program product as recited in claim 24, wherein the host computer and the client device are coupled by way of a connector cable.

30. Computer program product as recited in claim 29, wherein the connector cable is a FireWire cable or a USB cable.

31. Computer program product as recited in claim 24, wherein the preference file is stored in a computer readable medium.

32. Computer program product as recited in claim 24, further comprising:
computer code for passing the preference file from the host computer to the client device by way of the computer readable medium.

33. Computer program product as recited in claim 24, wherein the client device is a thin client device that includes a small display screen.

34. Computer program product as recited in claim 33, wherein the client device is a cellular telephone or a Personal Digital Assistant (PDA) or paging device or a MP3 player.

35. Computer program product as recited in claim 24, wherein a combination of more than one of the updated programmable input sensors can be used simultaneously to perform a single function such that a total number of functions executed by the programmable input sensors is greater than the number of user programmable input sensors.

* * * * *